US011570067B2

(12) United States Patent
Kudo et al.

(10) Patent No.: US 11,570,067 B2
(45) Date of Patent: Jan. 31, 2023

(54) ANALYSIS SYSTEM AND ANALYSIS METHOD

(71) Applicant: NIPPON TELEGRAPH AND TELEPHONE CORPORATION, Tokyo (JP)

(72) Inventors: Ichiro Kudo, Tokyo (JP); Hiroyuki Onishi, Tokyo (JP); Hiroshi Osawa, Tokyo (JP); Hiroshi Suzuki, Tokyo (JP); Takeaki Nishioka, Tokyo (JP); Yuki Miyoshi, Tokyo (JP); Yuhei Hayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 33 days.

(21) Appl. No.: 17/270,410

(22) PCT Filed: Aug. 13, 2019

(86) PCT No.: PCT/JP2019/031847
§ 371 (c)(1),
(2) Date: Feb. 22, 2021

(87) PCT Pub. No.: WO2020/040002
PCT Pub. Date: Feb. 27, 2020

(65) Prior Publication Data
US 2021/0250259 A1    Aug. 12, 2021

(30) Foreign Application Priority Data
Aug. 24, 2018 (JP) .............................. JP2018-157845

(51) Int. Cl.
*H04L 12/26* (2006.01)
*H04L 12/24* (2006.01)
(Continued)

(52) U.S. Cl.
CPC ............ *H04L 43/026* (2013.01); *H04L 41/14* (2013.01)

(58) Field of Classification Search
CPC ... H04L 43/026; H04L 41/14; H04L 41/0836; H04L 41/147; H04L 41/5025; H04L 43/50
See application file for complete search history.

(56) References Cited

U.S. PATENT DOCUMENTS 8,995,249 B1 * 3/2015 Roy ........................ H04L 45/22
                                                         370/254
11,228,667 B2 * 1/2022 Hong ...................... H04L 69/24
(Continued)

FOREIGN PATENT DOCUMENTS

JP    2008219685 A    9/2008
JP     201398706 A    5/2013

OTHER PUBLICATIONS

Japan Network Security Association (2016) "Textbooks for Security Organizations: Functions, Roles, and Personnel Skills," Edition 1.0.
(Continued)

*Primary Examiner* — Rasheed Gidado

(57) ABSTRACT

A collection device (10) collects traffic from a core network (10N) connected to a plurality of operator networks (20N). Further, an analysis device has a plurality of functions of analyzing traffic. Further, a setting device sets a scenario that designates at least one of the plurality of functions. Further, a pre-processing device converts the traffic collected by the collection device (10) to traffic of a format suitable for the function designated by the scenario. Further, a distribution device distributes the traffic converted by the pre-processing device to a designated function.

20 Claims, 5 Drawing Sheets

(51) Int. Cl.
  *H04L 43/026* (2022.01)
  *H04L 41/14* (2022.01)

(56) References Cited

U.S. PATENT DOCUMENTS

| | | | | |
|---|---|---|---|---|
| 2010/0150049 A1* | 6/2010 | Kim | ............... | H04W 76/12 |
| | | | | 370/312 |
| 2012/0129447 A1* | 5/2012 | Nitta | ............... | H01M 10/0413 |
| | | | | 455/9 |
| 2012/0157106 A1* | 6/2012 | Wang | ............... | H04B 17/3913 |
| | | | | 455/446 |
| 2017/0048109 A1* | 2/2017 | Kant | ............... | H04L 41/145 |

OTHER PUBLICATIONS

Information-Technology Promotion Agency, Japan (2018) "OSS model curriculum learning guidance 3-2-Response: Knowledge of Network Management," [online] Accessed on Aug. 13, 2018 (Reading Day) website: https://www.ipa.go.jp/files/000056034.pdf.

Sakura Internet Co., Ltd. (2018) "Application Example of Non Sampled Traffic Analysis—iDC edition," [online] Accessed on Aug. 13, 2018 (Reading Day) website: https://www.janog.gr.jp/meeting/janog19/files/Flow_Ohkubo.pdf.

Kobayashi, Atsushi (2009) "Multipurpose Traffic Monitoring with Flow-based Measurement," IEICE Technical Report vol. 109: 137, pp. 43-48.

Yagi et al. (2006) A Distributed Traffic-Monitoring Scheme for Overlay Networks vol. 105: 602, pp. 7-12.

\* cited by examiner

ANALYSIS SYSTEM AND ANALYSIS METHOD

CROSS-REFERENCE TO RELATED APPLICATIONS

This application is a U.S. 371 Application of International Patent Application No. PCT/JP2019/031847, filed on 13 Aug. 2019, which application claims priority to and the benefit of JP Application No. 2018-157845, filed on 24 Aug. 2018, the disclosures of which are hereby incorporated herein by reference in their entireties.

TECHNICAL FIELD

The present disclosure relates to an analysis system and an analysis method.

BACKGROUND ART

A carrier network has a plurality of operator networks and a core network that connects the operator networks. In the related art, as a method of performing failure analysis or security analysis of a carrier network, a method in which an engineer dispatched to a location of equipment such as a router included at an edge of an operator network and a core network (hereinafter sometimes simply referred to as an edge) connects an analysis device to the equipment to perform analysis is known.

CITATION LIST

Non Patent Literature

Non Patent Literature 1: Japan Network Security Association (JNSA), "Textbook v1.0 for Security Response Team," [online], [Retrieved on Aug. 13, 2018], Internet (https://www.jnsa.org/result/2016/isog-j/data/textbook_soc-csirt_v1.0.pdf) Non Patent Literature 2: Information-technology Promotion Agency (IPA), "OSS Model Curriculum Learning Guidance 3-2-Advanced. Knowledge about Network Management," [online], [Retrieved on Aug. 13, 2018], Internet (https://www.ipa.gojp/files/000056034.pdf) Non Patent Literature 3: Sakura Internet, "Application Example of Non Sampled Traffic Analysis-iDC edition," [online], [Retrieved on Aug. 13, 2018], Internet (https://www.janog-.gr.jp/meeting/Janog19/files/Flow_Ohkubo.pdf)

SUMMARY OF THE INVENTION

Technical Problem

However, the method of the related art has a problem that it may be difficult for failure analysis or security analysis in the carrier network to be efficiently performed. For example, edges of the carrier network may be installed at places geographically separated from each other. In such a case, dispatching an engineer to each of the edges is highly costly in terms of money or time.

Means for Solving the Problem

In order to solve the above-described problems and achieve the object, an analysis system includes a collection unit configured to collect traffic from a core network connected to a plurality of networks, an analysis unit configured to analyze traffic by a plurality of functional capabilities included in the analysis unit, a setting unit configured to set a scenario that designates at least one of the plurality of functional capabilities, a conversion unit configured to convert the traffic collected by the collection unit to traffic of a format suitable for the at least one of the plurality of functional capabilities designated by the scenario, and a distribution unit configured to distribute the traffic converted by the conversion unit to the at least one of the plurality of functional capabilities that is designated.

Effects of the Invention

According to the present disclosure, it is possible to efficiently perform the failure analysis or the security analysis in a carrier network.

DESCRIPTION OF EMBODIMENTS

Hereinafter, embodiments of an analysis system and an analysis method according to the present application will be described in detail with reference to the drawings. The present disclosure is not limited to the embodiments described below.

Configuration of First Embodiment

Figure 1:
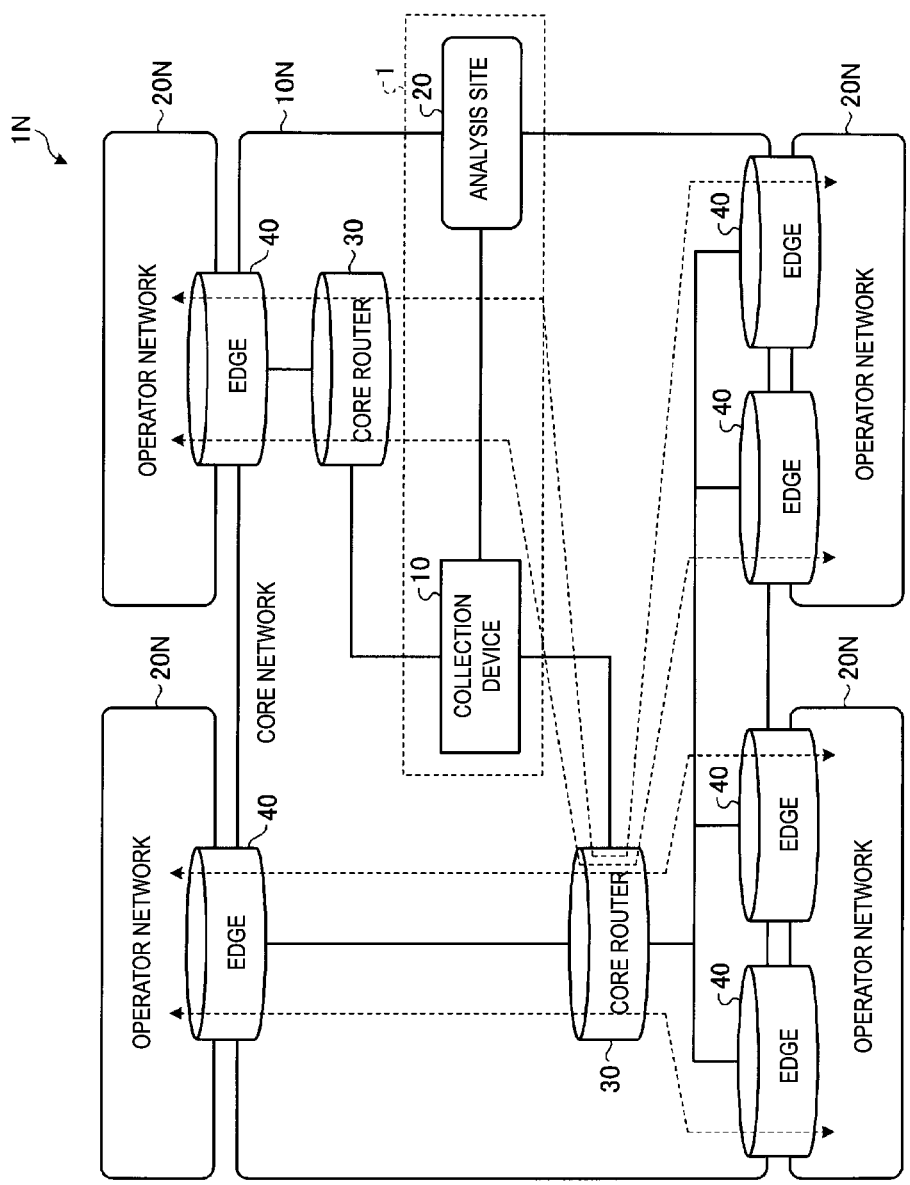
FIG. 1 is a diagram illustrating an example of a configuration of a carrier network according to a first embodiment.

First, a configuration of a carrier network including an analysis system according to a first embodiment will be described with reference to FIG. 1. FIG. 1 is a diagram illustrating an example of the configuration of the carrier network according to the first embodiment. A carrier network 1N includes a core network 10N and an operator network 20N, as illustrated in FIG. 1. Further, the carrier network 1N includes an analysis system 1.

The core network 10N includes a core router 30. The core router 30 performs routing and forwarding of traffic in the core network 10N. It is assumed that the edges 40 between the core network 10N and the operator network 20N are at places geographically separated from each other. For example, the respective edges may be provided in different regions in a country or outside the country. Thus, dispatching an engineer to the edge 40 for the failure analysis or the security analysis of the carrier network 1N incurs a high cost.

The analysis system 1 includes a collection device 10 and an analysis site 20. The analysis system 1 is a system for performing the failure analysis or the security analysis of the carrier network 1N. According to the analysis system 1, the failure analysis or the security analysis can be performed without dispatching an engineer to the edge 40.

The collection device 10 collects traffic from the core network 10N connected to a plurality of operator networks 20N. Further, the collection device 10 forwards the collected traffic to the analysis site 20. Further, the core router 30 may have a function of the collection device 10. In that case, the core router 30 collects traffic from the core network 10N and forwards the collected traffic to the analysis site 20. The collection device 10 and the core router 30 are examples of a collection unit.

Here, the analysis site 20 is a set of, for example, devices for performing the failure analysis or the security analysis in the present embodiment. The analysis site 20 may be one device or may be a system including a plurality of devices connected so that the devices can perform data communication with each other. Further, a plurality of analysis sites 20 may be present for one core network 10N. In the following description, traffic may be read as a set of packets to be transmitted and received.

For example, the collection device 10 is connected to the core router 30 and collects the traffic that is forwarded by the core router 30. Further, the analysis site 20 is provided inside or outside of the core network 10N, and can transmit and receive data to and from at least the collection device 10.

Figure 2:
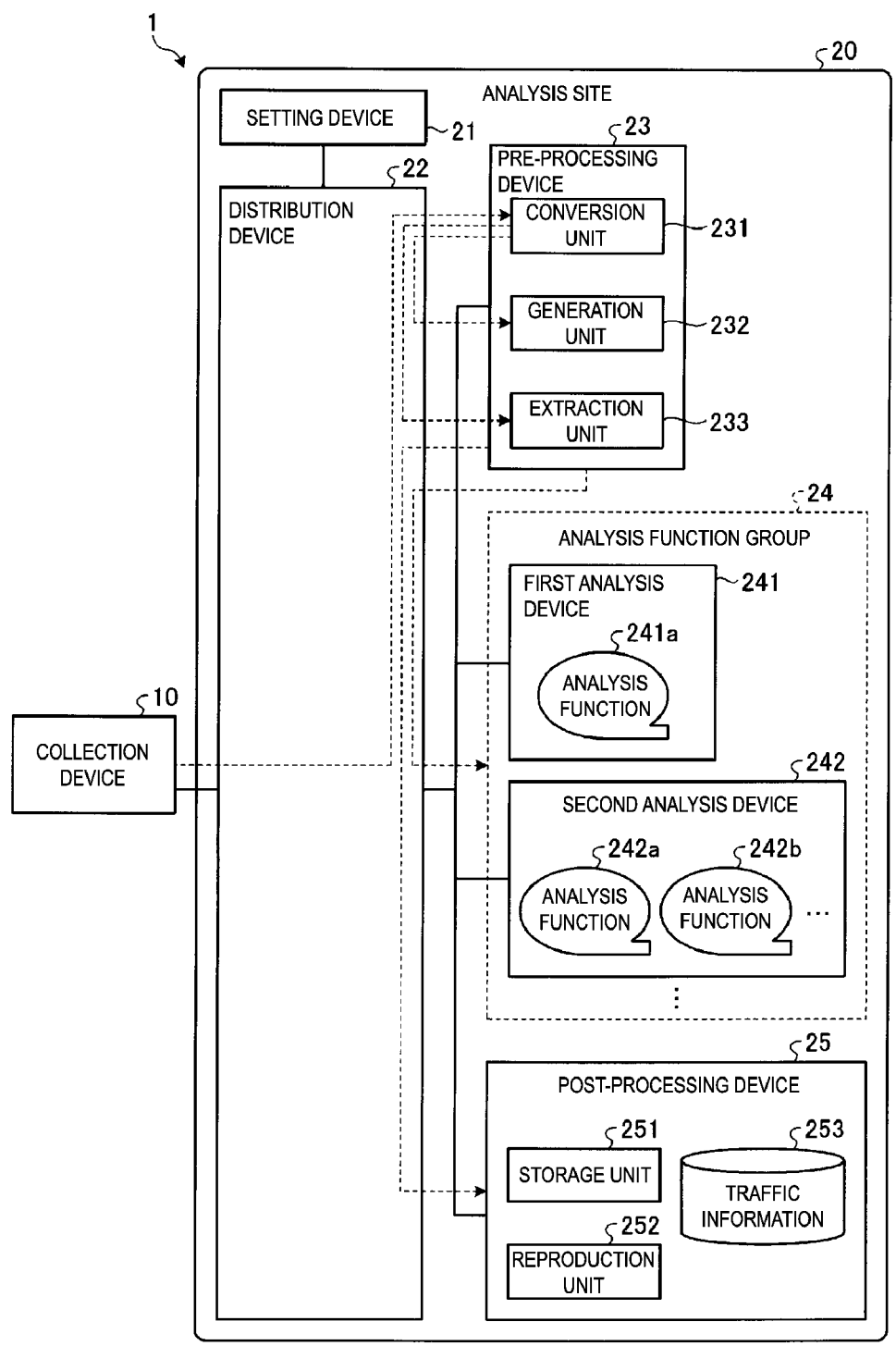
FIG. 2 is a diagram illustrating an example of a configuration of an analysis system according to the first embodiment.

A configuration of the analysis system 1 will be described with reference to FIG. 2. FIG. 2 is a diagram illustrating an example of the configuration of the analysis system according to the first embodiment. The analysis system 1 includes a setting device 21, a distribution device 22, a pre-processing device 23, an analysis function group 24, and a post-processing device 25, as illustrated in FIG. 2. Further, the analysis function group 24 includes a first analysis device 241 and a second analysis device 242. The number of analysis devices included in the analysis system 1 may be one or more.

The collection device 10 collects traffic from the core network 10N connected to the plurality of operator networks 20N. The collection device 10 collects the traffic of the core network 10N using sampling copy or non-sampling copy.

Further, the collection device 10 has a policing function. For example, when a band of the traffic collected by the non-sampling copy in the core network 10N is 10 Gbps and a band between the collection device 10 and the analysis site 20 is limited to 5 Gbps, the collection device 10 limits the collected traffic to 5 Gbps using the policing function and then forwards resultant traffic to the analysis site 20. Further, the collection device 10 can encapsulate the collected traffic and forward the encapsulated traffic to the analysis site 20.

Further, the collection device 10 may perform the collection of the traffic at any time when an event requiring analysis occurs, may perform the collection of the traffic at all times to perform regular monitoring, or may periodically perform the collection of the traffic at a determined time on a determined date. Further, the collection device 10 can collect the traffic after filtering the traffic using an Access Control List (ACL) function.

The setting device 21 sets a scenario that designates at least one of a plurality of functions. The scenario designates any one of the analysis functions included in the analysis function group 24 and further designates a traffic collection method, pre-processing, post-processing, and the like. The setting device 21 may receive the designation of the scenario to be set from the user.

The distribution device 22 distributes the traffic and data obtained on the basis of the traffic (hereinafter collectively referred to as the distribution data) to each device and processing unit of the analysis site 20 according to the scenario. The distribution device 22 can distribute the distribution data in units of flows.

Further, the distribution device 22 can further receive data from a distribution destination of the distribution data and further distribute the data to the next distribution destination. Further, the distribution device 22 can connect a plurality of distribution destinations in a string and continuously pass the distribution data. Further, the distribution device 22 can distribute the same distribution data to a plurality of distribution destinations using a mirror function. Further, the distribution device 22 confirms whether the distribution is performed correctly using an Operations, Administration, Maintenance (OAM) function.

The pre-processing device 23 performs pre-processing for analyzing traffic. The pre-processing device 23 includes a conversion unit 231, a generation unit 232, and an extraction unit 233.

The conversion unit 231 converts the traffic collected by the collection device 10 to traffic of a format suitable for the function designated by the scenario. For example, the conversion unit 231 removes a tunnel assigned to the traffic collected by the collection device 10.

Here, in the core network 10N, a tunnel function is used for the purpose of forwarding packets at a high speed and logically dividing traffic in units of users. Some analysis functions cannot analyze a packet to which a tunnel header has been added. Thus, the conversion unit 231 removes the tunnel header from the packet and converts the traffic to a format that can be analyzed by the analysis function.

The generation unit 232 generates flow information of the traffic on the basis of the traffic converted by the conversion unit 231. Some analysis functions set flow information such as netflow, sflow, and Internet Protocol Flow Information Export (IPFIX) as analysis targets, rather than individual packets included in traffic.

The extraction unit 233 performs filtering on the traffic converted by the conversion unit 231 to extract predetermined traffic. Some analysis functions set only traffic satisfying a predetermined condition among the traffic collected by the collection device 10 as an analysis target. Thus, the extraction unit 233 can filter the packets included in the traffic using 5-tuple, a protocol, or the like and extract the traffic that is the analysis target of the analysis function.

The conversion unit 231, the generation unit 232, and the extraction unit 233 can further set the data obtained by the respective processing units as processing targets. For example, the extraction unit 233 may perform filtering on the traffic of which the format has been converted by the conversion unit 231. Further, the generation unit 232 may generate the flow information from the traffic extracted by the extraction unit 233. The distribution device 22 distributes the distribution data to the conversion unit 231, the generation unit 232, and the extraction unit 233.

The analysis function group 24 has a plurality of functions for analyzing traffic. The analysis function group 24 may include a plurality of analysis devices. Further, each analysis device may have a plurality of analysis functions. In the example of FIG. 2, the analysis function group 24 includes a first analysis device 241 and a second analysis device 242. Further, the first analysis device 241 includes an analysis function 241a. Further, the second analysis device 242 includes an analysis function 242a and an analysis function 242b.

Here, each analysis function may be commercially available software for traffic analysis. For example, the first analysis device 241 and the second analysis device 242 are computers in which software for traffic analysis has been installed.

Further, for example, addition of the analysis function can be implemented by installing physical wirings on a connection switch at the analysis site 20, connecting a new analysis device, and changing settings of the setting device 21, the distribution device 22, and the like so that the distribution data can be distributed to the connected analysis device.

Further, virtualization of the analysis device allows the plurality of analysis sites 20 to share the analysis function of the analysis device. In this case, occupancy control that disables simultaneous activation by the plurality of analysis sites 20 is performed such that it is possible to prevent inconsistency in analysis results.

The distribution device 22 distributes the traffic and the like to each analysis function. In this case, the distribution device 22 can distribute the traffic pre-processed by each processing unit of the pre-processing device 23. That is, the distribution device 22 distributes the traffic converted by the conversion unit 231 to the designated function. Further, the distribution device 22 distributes the flow information generated by the generation unit 232 to the designated function. Further, the distribution device 22 distributes the traffic extracted by the extraction unit 233 to the designated function.

The post-processing device 25 includes a storage unit 251 and a reproduction unit 252. Further, the post-processing device 25 stores traffic information 253. The storage unit 251 stores the traffic analyzed by the analysis function in a storage area as the traffic information 253. Further, the reproduction unit 252 reproduces the traffic stored as the traffic information 253 in a predetermined network environment. The traffic information 253 may be traffic before the pre-processing is performed by the pre-processing device 23 or may be traffic after the pre-processing is performed. Further, the post-processing device 25 can write the traffic information 253 to another storage for archive.

Here, examples of items designated by the scenario set by the setting device 21 are described below.

Whether the collection device 10 performs sampling copy or non-sampling copy.

A timing at which the collection device 10 collects the traffic (at any time, always, or regularly).

Whether the policing function, the encapsulation function, and the ACL function of the collection device 10 are enabled.

Distribution destination and distribution order of the distribution device 22.

Whether the mirror function and the OAM function of the distribution device 22 are enabled.

Whether format conversion in the conversion unit 231 is performed, and a format to be converted.

Whether the generation unit 232 performs generation of the flow information, and a format of the flow information.

Whether the extraction unit 233 performs extraction, and filtering conditions.

The analysis function to be used among the analysis functions in the analysis function group 24.

Whether the storage unit 251 stores the traffic information 253.

Further, it is assumed that a scenario is prepared for each event. For example, because different analysis functions and different traffic pre-processing are used between Web server attack analysis and equipment failure analysis, different scenarios are prepared.

Figure 3:
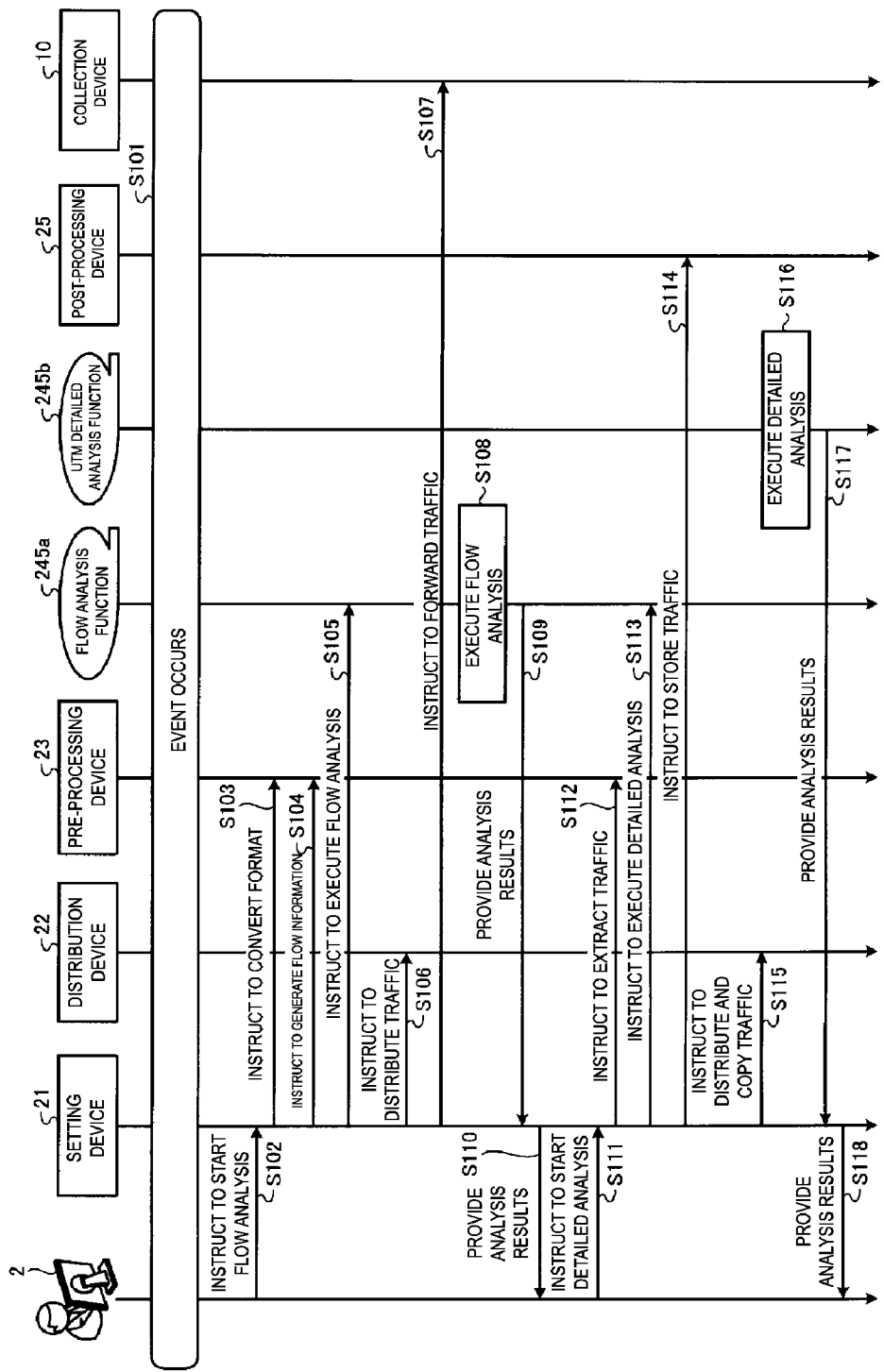
FIG. 3 is a sequence diagram illustrating an example of processing of the analysis system according to the first embodiment.

An example of specific processing of the analysis system 1 will be described herein with reference to FIG. 3. FIG. 3 is a sequence diagram illustrating an example of processing of the analysis system according to the first embodiment.

Further, in the example of FIG. 3, it is assumed that a flow analysis function 245a and a Unified Threat Management (UTM) detailed analysis function 245b are used. Further, the flow analysis function 245a and the UTM detailed analysis function 245b are included in the analysis function group 24.

As illustrated in FIG. 3, when an event occurs (step S101), the user instructs the setting device 21 to start the flow analysis from the terminal 2 (step S102). Here, the terminal 2 is a terminal that can access the setting device 21. Further, the event is an attack on a server on the carrier network 1N or failure of equipment.

The setting device 21 instructs the pre-processing device 23 to perform traffic format conversion and flow information generation according to the scenario corresponding to the flow analysis function 245a (steps S103 and S104). Further, the setting device 21 instructs the flow analysis function 245a to execute the flow analysis (step S105). Further, the setting device 21 instructs the distribution device 22 to distribute the traffic (step S106). Further, the setting device 21 instructs the collection device 10 to forward the collected traffic (step S107).

Here, the flow analysis function 245a executes the flow analysis (step S108). Note that, at this time, because the collection device 10, the distribution device 22, and the pre-processing device 23 are executing respective processes according to the instruction from the setting device 21, the traffic subjected to the pre-processing is distributed to the flow analysis function 245a.

The flow analysis function 245a provides an analysis result to the setting device 21 (step S109). Further, the setting device 21 provides the analysis result to the terminal 2 (step S110). Here, the user who confirms the analysis result using the terminal 2 instructs the setting device 21 to start detailed analysis (step S111).

The setting device 21 instructs the pre-processing device 23 to extract the traffic according to the scenario corresponding to the UTM detailed analysis function 245b (step S112). Further, the setting device 21 instructs the UTM detailed analysis function 245b to execute the detailed analysis (step S113). Further, the setting device 21 instructs the post-processing device 25 to store the traffic (step S114). Further, the setting device 21 instructs the distribution device 22 to distribute and copy the traffic (step S115).

Here, the UTM detailed analysis function 245b executes detailed analysis (step S116). Further, the post-processing device 25 stores the traffic copied by the distribution device 22 as the traffic information 253.

The UTM detailed analysis function 245b provides the analysis result to the setting device 21 (step S117). Further, the setting device 21 provides the analysis result to the terminal 2 (step S118).

Processing of First Embodiment

Figure 4:
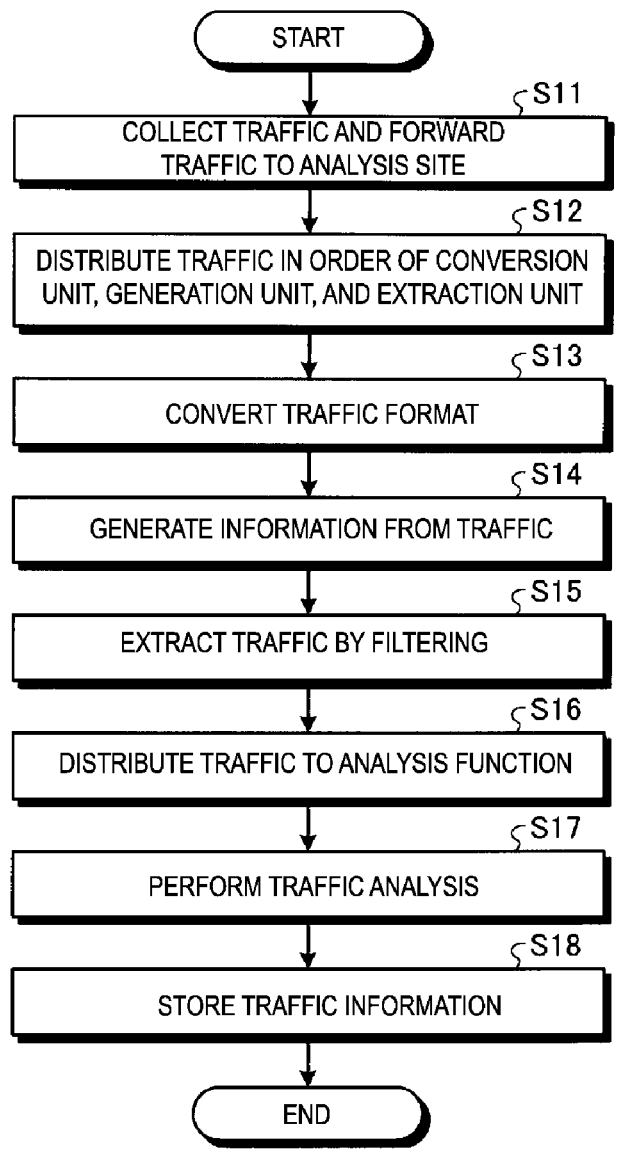
FIG. 4 is a flowchart illustrating a flow of processing of the analysis system according to the first embodiment.

A flow of processing of the analysis system 1 will be described with reference to FIG. 4. FIG. 4 is a flowchart illustrating a flow of processing of the analysis system according to the first embodiment. First, the collection device 10 collects the traffic and forwards the traffic to the analysis site 20, as illustrated in FIG. 4 (step S11).

The distribution device 22 distributes the traffic in an order of the conversion unit 231, the generation unit 232, and the extraction unit 233 (step S12). Which of the processing units of the pre-processing device 23 is executed depends on the scenario. Here, it is assumed that the processing is executed by all of the conversion unit 231, the generation unit 232, and the extraction unit 233.

The conversion unit 231 converts a format of the distributed traffic (step S13). Further, the generation unit 232 generates flow information from the distributed traffic (step S14). Further, the extraction unit 233 extracts the traffic from the distributed traffic by filtering (step S15).

The distribution device 22 then distributes the traffic to the analysis function designated by the scenario (step S16). The analysis function executes the analysis of traffic (step S17). Further, the post-processing device 25 stores traffic used for analysis in the storage area as the traffic information 253.

Effects of First Embodiment

The collection device 10 collects traffic from the core network 10N connected to a plurality of operator networks 20N. Further, the analysis device has a plurality of functions of analyzing traffic. Further, the setting device 21 sets a scenario that designates at least one of the plurality of functions. Further, the pre-processing device 23 converts the traffic collected by the collection device 10 to traffic of a format suitable for the function designated by the scenario. Further, the distribution device 22 distributes the traffic converted by the pre-processing device 23 to the designated function. Thus, in the present embodiment, functions necessary for analysis of the carrier network are integrated in the analysis site. Further, the traffic of the carrier network is forwarded to the analysis site. Thus, according to the present embodiment, it is not necessary for an engineer to be dispatched to an installation site such as the edge, and it is possible to efficiently perform the failure analysis or the security analysis in the carrier network.

The pre-processing device 23 removes the tunnel assigned to the traffic collected by the collection device 10. This allows analysis using an analysis function in which only traffic to which no tunnel is assigned is a target.

The generation unit 232 generates flow information of the traffic on the basis of the traffic converted by the conversion unit 231. Further, the distribution device 22 distributes the flow information generated by the generation unit 232 to the designated function. This allows analysis using an analysis function in which the flow information is a target.

The extraction unit 233 performs filtering on the traffic converted by the conversion unit 231 to extract predetermined traffic. Further, the distribution device 22 distributes the traffic extracted by the extraction unit 233 to the designated function, making it possible to extract only the traffic required for analysis and to reduce a processing load of the analysis function.

Other Embodiments

In the above-described embodiment, scenario setting, traffic distribution, pre-processing, analysis, and post-processing are executed by separate devices. On the other hand, scenario setting, traffic distribution, pre-processing, analysis, and post-processing may be executed by one device.

System Configuration and the Like

Further, each component of each illustrated device is a functional conceptual component and does not necessarily need to be physically configured as illustrated in the drawings. That is, a specific form of distribution and integration of the respective devices is not limited to the form illustrated in the drawings, and all or some of the devices can be distributed or integrated functionally or physically in any units according to various loads, and use situations. Further, all or some of processing functions to be performed in each of the devices can be implemented by a CPU and a program analyzed and executed by the CPU, or can be implemented as hardware using wired logic.

Further, all or some of the processing operations described as being performed automatically among the processing operations described in the present embodiment can be performed manually. Alternatively, all or some of the processing operation described as being performed manually can be performed automatically using a known method. In addition, information including the processing procedures, control procedures, specific names, and various types of data or parameters illustrated in the above literature or drawings can be optionally changed unless otherwise described.

Program

In an embodiment, each device of the analysis system 1 can be implemented by an analysis program that executes the analysis process being installed in a desired computer as package software or online software. For example, it is possible to cause an information processing device to function as the analysis device by causing the information processing device to execute the analysis program. The information processing device described here includes a desktop or laptop personal computer. Further, a mobile communication terminal such as a smart phone, a feature phone, or a Personal Handyphone System (PHS), or a slate terminal such as a Personal Digital Assistant (PDA), for example, is included in a category of the information processing device.

Further, the analysis system 1 can be implemented as an analysis server device that provides services regarding the analysis process to a client, which is a terminal device that is used by a user. For example, the analysis server device is implemented as a server device that provides an analysis service in which an input is the traffic of the core network and an output is the analysis result. In this case, the analysis server device may be implemented as a Web server or may be implemented as a cloud that provides services regarding the analysis through outsourcing.

Figure 5:
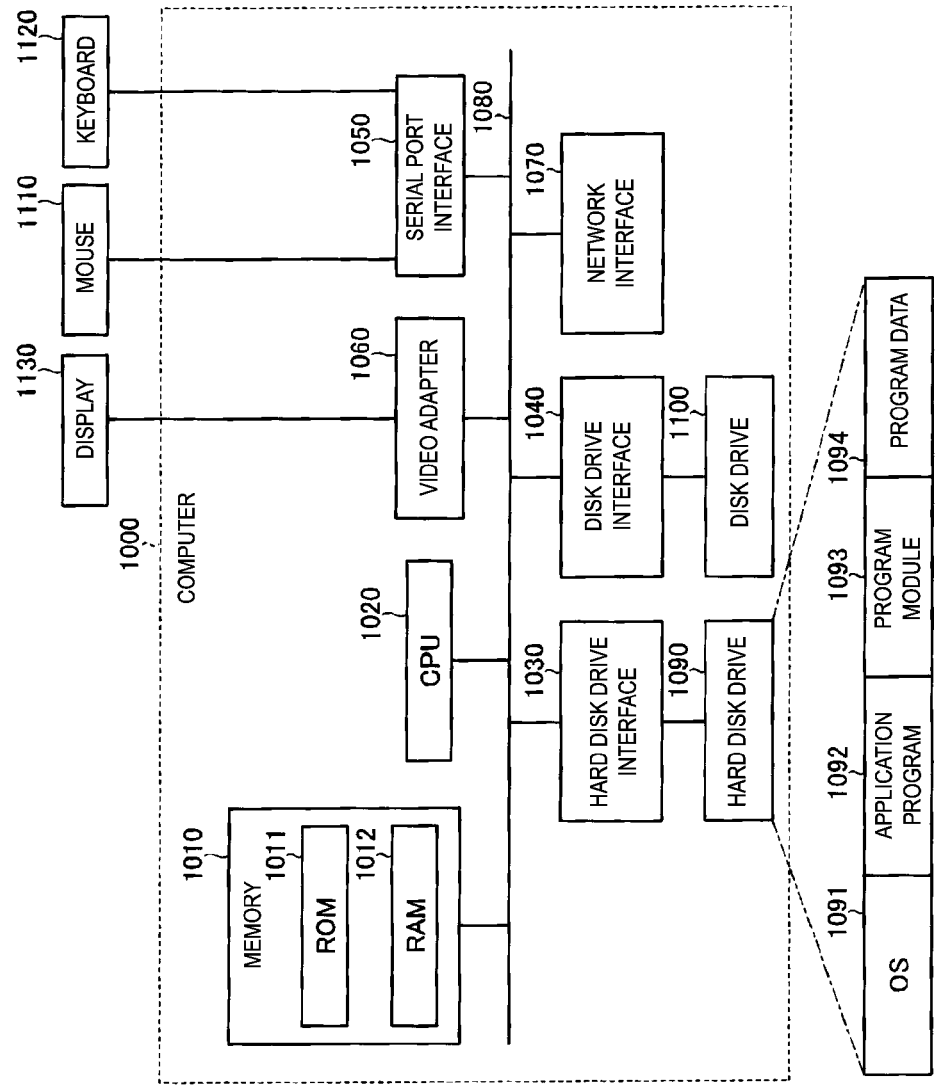
FIG. 5 is a diagram illustrating an example of a computer that executes an analysis program.

FIG. 5 is a diagram illustrating an example of a computer that executes an analysis program. A computer 1000 includes, for example, a memory 1010 and a CPU 1020. Further, the computer 1000 includes a hard disk drive interface 1030, a disc drive interface 1040, a serial port interface 1050, a video adapter 1060, and a network interface 1070. These units are connected by a bus 1080.

The memory 1010 includes a Read Only Memory (ROM) 1011 and a RAM 1012. The ROM 1011 stores, for example, a boot program, such as a Basic Input Output System (BIOS). The hard disk drive interface 1030 is connected to a hard disk drive 1090. The disc drive interface 1040 is connected to a disc drive 1100. A detachable storage medium such as a magnetic disk or optical disc, for example, is inserted into the disc drive 1100. The serial port interface 1050 is connected to, for example, a mouse 1110 and a keyboard 1120. The video adapter 1060 is connected to a display 1130, for example.

The hard disk drive 1090 stores, for example, an OS 1091, an application program 1092, a program module 1093, and program data 1094. That is, a program defining each processing operation of the analysis system 1 is implemented as the program module 1093 in which computer-executable code is described. The program module 1093 is stored in, for example, the hard disk drive 1090. For example, the program module 1093 for executing the same processing operation as that of a functional configuration in the analysis system 1 is stored in the hard disk drive 1090. The hard disk drive 1090 may be replaced with an SSD.

Further, configuration data to be used in the process of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the process of the embodiment described above.

The program module 1093 or the program data 1094 is not limited to being stored in the hard disk drive 1090, and may be stored, for example, in a detachable storage medium and read by the CPU 1020 via the disc drive 1100 or the like. Alternatively, the program module 1093 and the program data 1094 may be stored in another computer connected via a network (a Local Area Network (LAN), a Wide Area Network (WAN), or the like). The program module 1093 and the program data 1094 may be read from another computer via the network interface 1070 by the CPU 1020.

REFERENCE SIGNS LIST

1 Analysis system
1N Carrier network
2 Terminal
10 Collection device
10N Core network
20 Analysis site
20N Operator network
21 Setting device
22 Distribution device
23 Pre-processing device
24 Analysis function group
25 Post-processing device
30 Core router
40 Edge
231 Conversion unit
232 Generation unit
233 Extraction unit
241 First analysis device
241a, 242a, 242b Analysis function
242 Second analysis device
245a Flow analysis function
245b UTM detailed analysis function
251 Storage unit
252 Reproduction unit
253 Traffic information

The invention claimed is:

1. An analysis system comprising a processor configured to execute a method comprising:
   collecting traffic data from a core network connected to a plurality of networks;
   setting a scenario that designates at least one of a plurality of functional capabilities for analyzing the traffic data, wherein the scenario is associated with an event in the core network, the scenario includes instructions associated with one or more of: timing associated with collecting the traffic data, formatting of the traffic data, analyzing according to a functional capability, or post-processing of analyzing the traffic data;
   converting, based on the scenario, the traffic data into formatted traffic data according to a format suitable for the at least one of the plurality of functional capabilities designated by the scenario;
   distributing the formatted traffic data to the at least one of the plurality of functional capabilities that is designated by the scenario;
   analyzing the distributed formatted traffic data using the at least one of the plurality of functional capabilities according to the scenario; and
   storing a result of the analyzing the formatted traffic data.

2. The analysis system according to claim 1, the processor further configured to execute a method comprising:
   when the traffic data includes a tunnel assigned for separating the traffic data into a logical network, removing the tunnel assigned to the traffic data.

3. The analysis system according to claim 1, the processor further configured to execute a method comprising:
   generating flow information of the formatted traffic data based on the formatted traffic data,
   wherein the distributing further comprises distributing the flow information to the at least one of the plurality of functional capabilities that is designated.

4. The analysis system according to claim 1, the processor further configured to execute a method comprising:
   filtering on the formatted traffic data extract predetermined traffic data for analysis,
   wherein the distributing further comprises distributing the predetermined traffic data to the at least one of the plurality of functional capabilities that is designated.

5. An analysis method comprising:
   collecting traffic data from a core network connected to a plurality of networks;
   setting a scenario that designates at least one of a plurality of functional capabilities for analyzing the traffic data, wherein the scenario is associated with an event in the core network, the scenario includes instructions associated with one or more of: timing associated with collecting the traffic data, formatting of the traffic data, analyzing according to a functional capability, or post-processing of analyzing the traffic data;
   converting the traffic data into formatted traffic data based on a format suitable for the at least one of the plurality of functional capabilities designated by the scenario; and
   distributing, the formatted traffic data to the at least one of the plurality of functional capabilities that is designated by the scenario;
   analyzing the distributed formatted traffic data using the at least one of the plurality of functional capabilities according to the scenario; and
   storing a result of the analyzing the formatted traffic data.

6. The analysis system according to claim 3, the processor further configured to execute a method comprising:
   when the traffic data includes a tunnel assigned for separating the traffic data into a logical network, removing the tunnel assigned to the traffic data.

7. The analysis system according to claim 2, the processor further configured to execute a method comprising:
   filtering on the formatted traffic data to extract predetermined traffic for analysis,
   wherein the distributing further comprises distributing the predetermined traffic data to the at least one of the plurality of functional capabilities that is designated.

8. The analysis system according to claim 3, the processor further configured to execute a method comprising:
   filtering on the formatted traffic data to extract predetermined traffic for analysis,
   wherein the distributing further comprises distributing the predetermined traffic data to the at least one of the plurality of functional capabilities that is designated.

9. The analysis method according to claim 5, the method further comprising:

when the traffic data includes a tunnel assigned for separating the traffic data into a logical network, removing the a tunnel assigned to the traffic data.

10. The analysis method according to claim 5, the method further comprising:
generating flow information of the formatted traffic data,
wherein the distributing further comprises distributing the flow information to the at least one of the plurality of functional capabilities that is designated.

11. The analysis method according to claim 5, the method further comprising:
filtering on the formatted traffic data to extract predetermined traffic for analysis,
wherein the distributing further comprises distributing the predetermined traffic to the at least one of the plurality of functional capabilities that is designated.

12. The analysis method according to claim 10, the method further comprising:
when the traffic data includes a tunnel assigned for separating the traffic data into a logical network, removing the tunnel assigned to the traffic data.

13. The analysis method according to claim 9, the method further comprising:
filtering the formatted traffic data to extract predetermined traffic for analysis,
wherein the distributing further comprises distributing the predetermined traffic to the at least one of the plurality of functional capabilities that is designated.

14. The analysis method according to claim 10, the method further comprising:
filtering the formatted traffic data to extract predetermined traffic for analysis,
wherein the distributing further comprises distributing the predetermined traffic to the at least one of the plurality of functional capabilities that is designated.

15. A computer-readable non-transitory recording medium storing computer-executable instructions that when executed by a processor cause an analysis system to execute a method comprising:
collecting traffic data from a core network connected to a plurality of networks;
setting a scenario that designates at least one of a plurality of functional capabilities for analyzing the traffic data, wherein the scenario is associated with an event in the core network, the scenario includes instructions associated with one or more of: timing associated with collecting the traffic data, formatting of the traffic data, analyzing according to a functional capability, or post-processing of analyzing the traffic data;
converting the traffic data to formatted traffic data based on a format suitable for the at least one of the plurality of functional capabilities designated by the scenario; and
distributing the formatted traffic data to the at least one of the plurality of functional capabilities that is designated by the scenario;
analyzing the distributed formatted traffic data using the at least one of the plurality of functional capabilities according to the scenario; and
storing a result of the analyzing the formatted traffic data.

16. The computer-readable non-transitory recording medium of claim 15, the computer-executable instructions when executed further causing the system to execute a method comprising:
when the traffic data includes a tunnel assigned for separating the traffic data into a logical network, removing the tunnel assigned to the traffic data.

17. The computer-readable non-transitory recording medium of claim 15, the computer-executable instructions when executed further causing the system to execute a method comprising:
generating flow information of the formatted traffic data based on the formatted traffic data,
wherein the distributing further comprises distributing the flow information to the at least one of the plurality of functional capabilities that is designated.

18. The computer-readable non-transitory recording medium of claim 15, the computer-executable instructions when executed further causing the system to execute a method comprising:
filtering on the formatted traffic data to extract predetermined traffic for analysis,
wherein the distributing further comprises distributing the predetermined traffic to the at least one of the plurality of functional capabilities that is designated.

19. The computer-readable non-transitory recording medium of claim 16, the computer-executable instructions when executed further causing the system to execute a method comprising:
when the traffic data includes a tunnel assigned for separating the traffic data into a logical network, removing the tunnel assigned to the traffic data.

20. The computer-readable non-transitory recording medium of claim 16, the computer-executable instructions when executed further causing the system to execute a method comprising:
filtering the formatted traffic data to extract predetermined traffic for analysis,
wherein the distributing further comprises distributing the predetermined traffic to the at least one of the plurality of functional capabilities that is designated.

* * * * *